United States Patent [19]

Ellis et al.

[11] 4,280,848
[45] Jul. 28, 1981

[54] SAG RESISTANT MORTAR COMPOSITIONS

[75] Inventors: Jeffrey R. Ellis, Hightstown, N.J.; Herman B. Wagner, Perkasie, Pa.

[73] Assignee: Tile Council of America Inc., Princeton, N.J.

[21] Appl. No.: 81,811

[22] Filed: Oct. 4, 1979

Related U.S. Application Data

[63] Continuation of Ser. No. 857,804, Dec. 5, 1977, abandoned, which is a continuation-in-part of Ser. No. 749,946, Dec. 20, 1976, Pat. No. 4,082,563.

[51] Int. Cl.$^3$ ................................................ C04B 7/35
[52] U.S. Cl. ........................................ 106/90; 106/93; 106/97; 260/29.6 S
[58] Field of Search ............... 106/90, 93, 97, 314, 106/315; 260/29.6 S

[56] References Cited

U.S. PATENT DOCUMENTS

| | | | |
|---|---|---|---|
| 2,307,270 | 1/1943 | Hodge | 106/315 |
| 3,030,258 | 4/1962 | Wagner | 106/93 |
| 3,243,307 | 3/1966 | Selden | 106/93 |
| 3,425,892 | 2/1969 | Edelson et al. | 106/315 |
| 3,782,991 | 1/1974 | Burge | 106/89 |
| 3,824,107 | 7/1974 | Weiant | 106/93 |
| 4,082,563 | 4/1978 | Ellis et al. | 106/93 |

*Primary Examiner*—James Poer
*Attorney, Agent, or Firm*—Morgan, Finnegan, Pine, Foley & Lee

[57] ABSTRACT

There are provided dry-set cement mortars comprising hydraulic cement and water soluble, high molecular weight polymers and gelatinous metal hydroxides and metal salts capable of forming gelatinous or hydrated hydroxides in the presence of aqueous base. These metal hydroxides and metal salts may be the hydroxides or salts of aluminum, the transition element metals, and the mixed salts of alkali metals or ammonium with certain trivalent metallic cations together with the appropriate anions. The novel sag resistant compositions allow for the replacement of asbestos fibers which are used to impart sag resistance in state-of-the-art dry-set Portland cement mortars.

25 Claims, No Drawings

SAG RESISTANT MORTAR COMPOSITIONS

CROSS-REFERENCE TO RELATED APPLICATIONS

This is a continuation of copending application Ser. No. 857,804, filed Dec. 5, 1977, now abandoned, which is a continuation-in-part of application Ser. No. 749,946, filed Dec. 20, 1976, now U.S. Pat. No. 4,082,563.

BACKGROUND OF THE INVENTION

In the installation of wall and floor covering surfaces such as ceramic tile, slate, marble and the like, numerous compositions have been developed which utilize a hydraulic cement such as Portland cement as the principal factor in the bonding adhesives. Ordinary Portland cement per se, or together with sand or limestone fillers, is generally ineffective for this purpose since it does not have the ability to retain the water used in mixing it for sufficient time to enable an adequate bonding cure to occur. In order to overcome this disadvantage, there was developed a type of adhesive now known in the art as dry-set Portland cement mortar. These mortars possess certain advantageous properties: they may be exposed to air after mixing with water for a period of time; they may be applied to the substrates without undue hurry; they remain plastic for a sufficient period of time to permit small movements to be made in the tile installation after the initial substrate to surface contact; they develop strong bonding between the tile or similar surfacing and the substrate surface to which it is bonded; and they possess a reasonably predictable initial set time, minimum drying shrinkage, and some sag resistance. A number of such dry-set compositions have been developed starting with the initial composition of one of the co-inventors herein as disclosed in U.S. Pat. No. 2,820,713.

One of the many properties required by mortar for setting tile is that it be sag resistant. Sag resistance is a term used in the trade and defined by a test method that is part of the American National Standard Specification for Dryset Portland Mortar Cement—A 118.1. Sag resistance is a property or characteristic relating to the ability of the mortar to resist movement under load until a certain load level is reached. This property or characteristic is vitally important in dry-set mortars and also to a latex Portland cement mortar since a mortar to be practically functional must be in a slurry or paste form on the one hand, but also must be capable of supporting the load imposed on it by the tiles being set. It is vital that the mortar support the tile without any appreciable sinking of the tile into the mortar during the period in which the mortar sets. In wall applications sag resistance is even more critical because the mortar must hold the tile in position on the wall during the period in which the mortar is setting.

In the course of development of dry-set mortars, it was found that the sag resistance, that is to say, the resistance to downward movement of an initially set tile during the curing process, could be substantially minimized by the addition to the composition of asbestos fibers. Since the time of this initial discovery, it has been found that asbestos possesses a long-term but hidden carcinogenic effect and therefore the use of asbestos, particularly in fiber form, has been strictly controlled if not prohibited under certain circumstances. It has therefore become most important in this particular art to find substitutes for asbestos fiber to provide the desired sag resistance. This problem has been solved in the present invention by the use of certain salts which under appropriate conditions form gelatinous or hydrated hydroxides, as well as gelatinous metal hydroxides per se.

DESCRIPTION OF THE PRIOR ART

The use of certain metal salts, in particular, aluminum salts in mortar compositions generally, is, in certain circumstances, known. The use of such salts however in compositions of the type set forth in the present invention is not known, and the use of such metal salts as well as the metal hydroxides herein described for the purpose of increasing sag resistance in dry-set mortars is nowhere taught in the art.

In U.S. Pat. No. 1,901,890 to Barnhart, a mixture of certain sulphates, for example, sulphates of an alkali metal, aluminum and magnesium are taught for the purpose of creating a glaze forming and water-proofing composition for cementitious material. In U.S. Pat. No. 2,890,965, to Underdown, certain salts, inter alia, aluminum sulphate, are utilized to improve the plasticity and flowability of certain cementitious materials. The use of certain aluminum, iron, and chromium salts is disclosed in U.S. Pat. No. 2,390,138 to Vallandigham for the purpose of accelerating the setting of certain algenate salts used in the manufacture of dental casts.

U.S. Pat. No. 3,114,647 to Mecham discloses the use of certain double metal salts, that is to say, salts of ammonium and certain trivalent metals such as aluminum, iron, manganese and chromium, as well as aluminum sulphate per se for increasing the hardness of materials made from Portland cement. The Mecham composition specifies the use of sulfuric acid as well as certain specified quantities of calcium chloride in order to achieve the desired effect.

U.S. Pat. No. 3,313,638 to Konrad discloses the use of extremely low amounts of aluminum chloride in novel compositions for castable refractory material with reduced physical separation of cement from calcined kaolin clays.

U.S. Pat. No. 3,782,991 to Burge discloses the specific use of anhydrous aluminum sulphate as an accelerator for low temperature concreting.

SUMMARY OF THE INVENTION

There is provided a class of additives for water mixable cement compositions generally known as dry-set mortars, which replaces the undesirable asbestos fibers used heretofore in such compositions. These additive materials maintain the desired sag resistant properties heretofore provided by the asbestos fibers without exposing the persons handling said materials to the long term carcinogenic effects of asbestos fibers.

The novel additives of the present invention are gelatinous metal hydroxides and metal salts which are capable of forming a gelatinous or hydrated hydroxide in the presence of aqueous base. Said salts may be water soluble, they may be hydrated, or they may be anhydrous. The cations of the gelatinous metal hydroxides and metal salts of the present invention are selected from the groups consisting of aluminum cations, cations of the transition elements of period 4 other than copper, the cations of cerium or antimony, and mixed cations of the classification $M^I M^{III}$, where $M^I$ is an alkali metal or ammonium cation and $M^{III}$ is a trivalent metallic cation of periods 3 or 4.

In the case of the metal salts, the anions are selected from the anions of strong mineral acids, and carboxylic, preferably alkanoic acids having up to 20 carbon atoms in the chain.

The water mixable cement compositions of the present invention comprise, in addition to the foregoing additives, a hydraulic cement, suitably Portland cement, and at least one water soluble high molecular weight polymer.

In still other embodiments, the sag resistant compositions of this invention comprise, in addition to the described sag resistance imparting additives, an hydraulic cement, e.g., Portland cement, at least one water soluble high molecular weight polymer, and at least one substantially water insoluble polymer, the latter preferably in the form of a "latex", i.e., a dispersion of the polymer in water.

It is also contemplated that the dry compositions of the present invention further comprise inert fillers.

The present invention is further viewed as extending to said dry compositions when mixed with water, to methods of utilizing said water mixed compositions, and the assemblies or the like, resulting from the interposition of said wet cementitious compositions between a covering surfacing such as a tile or the like and a covered substrate such as a wall or the like.

DESCRIPTION OF THE PREFERRED EMBODIMENTS

The present invention relates to a novel water mixable cement composition, more particularly to the additives thereto which achieve the sag resistant effect of the heretofore used asbestos fibers without the carcinogenic effect of said fibers.

The novel compositions of the present invention comprise hydraulic cements most suitably Portland cement. In the most preferred embodiments of the present invention the dry compositions comprise at least 20% suitably between about 20 and about 99% by weight of Portland cement.

The compositions further comprise at léast one water soluble high molecular weight polymer. The molecular weight of the polymer is not critical, however it is desirable that the viscosity range of a 2% by weight aqueous solution of said polymers has a viscosity of between 80 and 30,000 centipoises. Among the water soluble cellulose ethers which are particularly preferred, may be mentioned the methyl ether of cellulose, hydroxypropylmethyl cellulose, hydroxypropyl cellulose, and hydroxyethyl cellulose. Other polymers which can be used are polyvinyl alcohol and polyacrylamide. It has been found that the foregoing polymers may be used not only singly but also in combination of one or more of said polymers within the composition as a whole. It should be stressed that the recitation of the foregoing preferred polymers is in no way intended to limit the scope of the present invention.

There are used, in the preferred embodiment of the invention, at least 0.2%, suitably between about 0.2 and 6% by weight of said polymer or polymers relative to the dry weight of the composition as a whole. In one particularly preferred embodiment of the invention there is utilized the methyl ether of cellulose, and in yet another embodiment polyacrylamide. It has also been found particularly valuable to utilize a combination of one of the aforesaid cellulose ethers with polyvinyl alcohol, suitably substantially hydrolyzed polyvinyl alcohol, most suitably 70 to 90% hydrolyzed grade polyvinyl alcohol.

In preferred embodiments, there are used, in admixture, based on the total weight of dry solids, from about 20 to about 99% by weight of Portland cement, from about 0.2 to about 6% by weight of a high molecular weight mortar soluble polymer and from about 0.5 to about 50% by weight of a substantially water insoluble polymer, preferably in the form of a latex. By way of illustration, the water insoluble polymer is selected from among polymeric materials including copolymers of styrene and butadiene, epoxy resins, polyvinyl chlorides, polyvinylidene chlorides, neoprene elastomers and polyvinyl acetate.

As stated heretofore, the additive salts utilized in the present invention all possess a common chemical characteristic, that is, that these salts are capable of forming gelatinous or hydrated hydroxides in the presence of an aqueous base. Furthermore, it has been found that powdered salts are preferred over granular salts.

Pursuant to the findings of the present invention which are set forth in greater detail in the experimental portion hereof herein below, the cations which may be employed in said salts or, when used, the gelatinous metal hydroxides, fall in the categories: Aluminum cations; cations of the transition elements of period 4: scandium, titanium, vanadium, chromium, manganese, iron, cobalt, nickel and zinc, particularly preferred among these cations are those of chromium, manganese, iron, nickel and zinc; it has also been found that the cations of cerium and antimony are useful for the purposes of the present invention; yet, another category of cations which falls within the ambit of the desired type of metal salts are those having mixed cations of mono and trivalent metals, these have been designated, for purposes of brevity herein, as $M^I M^{III}$ mixed salts. The $M^I$ cations are the cations of alkali metals suitably sodium, potassium, or ammonium, and $M^{III}$ are the trivalent metallic cations of periods 3 or 4 of the periodic table, most suitably aluminum, chromium, and iron.

The anions which may be utilized in the non-gelatinous salts which are capable of forming gelatinous or hydrated hydroxides are selected from the group consisting of the anions of strong mineral acids, most suitably sulphate, chloride, or nitrate, and the anions of carboxylic or alkanoic acids having up to 20 carbons in the chain. For the purpose of definition within the present patent application, formates and oxalates are considered to be anions of alkanoic acids. Particularly preferred among the organic anions are oxalate, and stearate. While certain anions have been listed herein above the invention is in no way to be considered as limited to those specific anions.

The invention includes both the hydrated and anhydrous salts formed from the foregoing cations and anions. It will be understood by those skilled in the art that certain anhydrous salts, particularly salts of certain mixed cations may not be available.

It has been found that the most preferred results in the compositions of the present invention are obtained when there is utilized at least 0.2% suitably between about 0.2 and about 5% by weight of dry composition of the aforesaid gelatinous metal hydroxides and/or metal salts.

The compositions of the present invention also contemplate, optionally, the use of certain inert fillers. Such fillers include sand, perlite, vermiculite, glass beads, powdered walnut shells, limestone, powdered inert metals, and pigments suitably pigments such as powdered titanium dioxide, and the like. The amount of such fillers utilized may of course vary substantially in accordance with properties desired in the final product. While the scope of the invention is not to be considered limited thereto, it has been found feasible to utilize a proportion as high as 4:1 of filler with respect to the cement component of the dry composition.

The amount of water utilized with the dry compositions defined hereinabove in order to achieve the working composition will vary somewhat depending upon the constitution of the dry composition. The amount of water utilized to give an adhesive of the desired properties is however principally influenced by the amount of inert filler employed. Thus, where there is employed no filler or substantially no filler, the proportion of water added to the dry mix will suitably be from about 30% to about 50% of the initial weight of the dry mix, on the other hand, where substantial amounts of coarse filler are employed, the amount of water utilized may be reduced to the order of from about 15 to about 40% by weight of the dry composition.

The dry compositions of the present invention are converted into the adhesive composition by adding the aforementioned amounts of water thereto in the manner generally accepted by those skilled in the art. The adhesive thus formed may be applied to any suitable covering surfacing which it is desired to affix to a second substrate surface. Since the general purpose of the present invention is to provide an adhesive composition with good sag resistance, it is generally presumed that such adhesive compositions will be employed where it is desirable to affix the first surfacing to a second surface from which it is likely to slide or settle were it not for the sag resistance properties. Again, while it is the general practice in the art to apply the adhesive to the second substrate which will be covered by the first surface, again the invention is not limited thereto and procedures whereby the adhesive is initially placed upon said first surface are to be considered to be within the scope of the present invention.

It is generally contemplated that the first surface that is to say, the surface to be applied to the substrate will be the rearward surface of a surfacing unit such as ceramic tile, slate, marble, and the like. It is further contemplated that the most general use will be with ceramic tile, specifically ceramic tile having at least one unglazed surface upon which the adhesive will be applied, it is further contemplated that said unglazed surface may have a substantially irregular surface to permit better adhesion of the adhesive thereto. Notwithstanding said irregularity, the surface of said irregular unit will be either substantially flat, or, when it is intended to be applied to a second substrate having a curved surface, said first surface will have a degree of curvature substantially conforming to the degree of curvature of the substrate upon which it is to be placed.

It is further contemplated that the amount of adhesive to be placed upon said surface shall generally be less than ⅜ of an inch in thickness when applied in an even layer but generally not be less than 1/32 of an inch in thickness. It is contemplated that the adhesive be applied to the substrate with a trowel, suitably a notched trowel, whereby the adhesive is formed into ribbons of adhesive deposited by said trowel upon said substrate. Said controlled irregularity of thickness is known to improve the adhesion of the surfacing unit to the substrate to which it is to be attached.

FORMULATION OF DRY SET MORTAR MIXES

Formulation I

The dry set Portland cement mortar dry mix designated herein below as DSM I has the following formulation:

1,000 grams Type I Portland Cement
1,000 grams Graded Silica sand (grade 30 mesh)
6 grams Methocel ® (65 HG, 4,000 cps).

The dry set Portland cement mortar dry mix designated herein below as DSM II has the following formulation:

2,000 grams Type I Portland cement
20 grams Methocel ® (65 HG)

Formulation II

The Portland cement mortar dry mix designated MDMI, for use between two water impervious surfaces, has the following formulation:

1,000 grams Type I Portland cement
1,000 grams Graded silica sand (grade 30 mesh)

Test Procedure I

Test procedure for sag resistance on vertical surfaces for dry set Portland cement mortar (A118.1-1967).

"Sag on Vertical Surfaces. Prepare mortar as in 5-1.2 and trowel onto the vertical surface of a dry cinder block between guide strips ¼ inch thick. Lightly tap a tile (Type B) onto the mortar surface immediately after applying mortar, with any back ribs on tile vertical. Accurately mark the top edge of the tile and record any downward displacement of the tile measured 2 hours after placement as the Sag."

The foregoing dry set mortar mixes were mixed with water and certain additives and tested in the above test procedure with the following results.

Test Procedure II

This test procedure is identical to test procedure I except that a metal or glass plate or a vitreous tile are substituted for a dry cinder block and an unglazed ceramic tile respectively.

EXAMPLE 1

DSM I and II were compounded with and without asbestos fiber, mixed with water and tested for sag resistance in accordance with the foregoing test procedure in proportions set forth below to give sag results noted in the final column.

| Amount DSM I | Amount DSM II | Amount Water | Additive | Amount Additive | Sag |
|---|---|---|---|---|---|
| 400 gms. | | 100 gms. | — | — | F/O |
| 400 gms. | | 100 gms. | asbestos fiber | 2 g | N/S |
| | 400 gms. | 140 gms. | — | — | F/O |
| | 400 gms. | 140 gms. | asbestos fiber | 4 g | N/S |

F/O = fell off
N/S — no sag

MDM I was tested as above.

| AMOUNT MDM I | AMOUNT WATER | ADDITIVE | AMOUNT ADDITIVE | SAG |
|---|---|---|---|---|
| 400 | 100 | — | — | F/O |
| 400 | 100 | Aluminum | 500 g | N/S |

-continued

| AMOUNT MDM I | AMOUNT WATER | ADDITIVE | AMOUNT ADDITIVE | SAG |
|---|---|---|---|---|
| | | Sulfate | | |

EXAMPLE 2

DSM I and II—Aluminum Salts

DSM I and II were compounded with hydrated and anhydrous aluminum salts, mixed with water and tested for sag resistance in accordance with Test Procedure I in the proportions set forth below to give the sag results reported in the final column.

| | WATER (gm) | ADDITIVE | AMOUNT ADDITIVE (gm) | SAG (inches) |
|---|---|---|---|---|
| DSM I (gm) | | | | |
| 99.75 | 25 | $Al_2(SO_4)_3 \cdot 0 H_2O$ | 0.25 | 5/16 |
| 99.50 | 25 | $Al_2(SO_4)_3 \cdot 0 H_2O$ | 0.5 | ⅛ |
| 99.25 | 25 | $AO_2(SO_4)_3 \cdot 0 H_2O$ | 0.75 | 0 |
| 98.0 | 25 | $Al_2(SO_4)_3 \cdot 6 H_2O$ | 2.0 | 0 |
| 98.0 | 25 | $Al_2(SO_4)_3 \cdot 14 H_2O$ | 2.0 | 0 |
| 99.5 | 25 | $Al_2(SO_4)_3 \cdot 18 H_2O$ | 0.5 | F/O |
| 99.0 | 25 | $Al_2(SO_4)_3 \cdot 18 H_2O$ | 1.0 | 3/16 |
| 98.5 | 25 | $Al_2(SO_4)_3 \cdot 18 H_2O$ | 1.5 | 1/32 |
| 98.0 | 25 | $Al_2(SO_4)_3 \cdot 18 H_2O$ | 2.0 | 0 |
| 99.2 | 25 | $Al_2O(C_2H_3O_2)_4 \cdot 4 H_2O$ | 0.8 | 1/16 |
| 98.5 | 25 | Al stearate (high gel) | 1.5 | 1/32 |
| 98.5 | 25 | Al stearate (low gel) | 1.5 | 1/16 |
| 99.5 | 25 | $AlCl_3 \cdot 6H_2O$ | 0.5 | F/O |
| 99.0 | 25 | $AlCl_3 \cdot 6H_2O$ | 1.0 | 7/16 |
| 98.5 | 25 | $AlCl_3 \cdot 6H_2O$ | 1.5 | 1/32 |
| 98.0 | 25 | $AlCl_3 \cdot 6H_2O$ | 2.0 | 0 |
| 98.5 | 37 | $Al_2(SO_4)_3 \cdot 18 H_2O$ | 0.5 | 5/16 |
| DSM II (gm) | | | | |
| 99.0 | 37 | $Al_2(SO_4)_3 \cdot 18 H_2O$ | 1.0 | ⅛ |
| 98.5 | 37 | $Al_2(SO_4)_3 \cdot 18 H_2O$ | 1.5 | 1/16 |
| 98.0 | 37 | $Al_2(SO_4)_3 \cdot 18 H_2O$ | 2.0 | 0 |

EXAMPLE 3

DSM I and II—Aluminum Salt Solution

DSM I and II was compounded with a 25% (w/w) aqueous aluminum salt solution, mixed with water and tested for sag resistance in accordance with Test Procedure I in the proportions set forth below to give the sag results reported in the final column.

| | WATER (gm) | ADDITIVE | AMOUNT ADDITIVE (gm) | SAG (inches) |
|---|---|---|---|---|
| DSM I (gm) | | | | |
| 99.5 | 25 | $AlCl_3 \cdot 6 H_2O$ | 0.5 | F/O |
| 99.0 | 25 | $AlCl_3 \cdot 6 H_2O$ | 1.0 | 7/16 |
| 98.5 | 25 | $AlCl_3 \cdot 6 H_2O$ | 1.5 | 0 |
| 98.0 | 25 | $AlCl_3 \cdot 6 H_2O$ | 2.0 | 0 |
| DSM II | | | | |
| 99.5 | 37 | $AlCl_3 \cdot 6 H_2O$ | 0.5 | ⅛ |
| 99.0 | 37 | $AlCl_3 \cdot 6 H_2O$ | 1.0 | 3/32 |

EXAMPLE 4

DSM I and II—Transition Metal Salts

DSM I and II were compounded with hydrated transition metal salts, mixed with water and tested for sag resistance in accordance with Test Procedure I in the proportions set forth below to give the sag results reported in the final column.

| | WATER (gm) | ADDITIVE | AMOUNT ADDITIVE (gm) | SAG (inches) |
|---|---|---|---|---|
| DSM I (gm) | | | | |
| 98 | 25 | $MnSO_4 \cdot H_2O$ | 2.0 | 5/16 |
| 98 | 25 | $Cr_2(SO_4)_3 \cdot 18 H_2O$ | 2.0 | 1/16 |
| 98 | 25 | $CoSO_4 \cdot 5 H_2O$ | 2.0 | 1/32 |
| 98 | 25 | $NiSO_4 \cdot 6 H_2O$ | 2.0 | ⅛ |
| 98 | 25 | $ZnSO_4 \cdot 7 H_2O$ | 2.0 | 1/16 |
| 98.0 | 25 | $Sb_2(SO_4)_3$ | 2.0 | 1/32 |
| 99.5 | 25 | $Fe_2(SO_4)_3 \cdot 9 H_2O$ | 0.5 | F/O |
| 99.0 | 25 | $Fe_2(SO_4)_3 \cdot 9 H_2O$ | 1.0 | 1⅛ |
| 98.5 | 25 | $Fe_2(SO_4)_3 \cdot 9 H_2O$ | 1.5 | 3/16 |
| 98.0 | 25 | $Fe_2(SO_4)_3 \cdot 9 H_2O$ | 2.0 | 3/32 |
| DSM II | | | | |
| 99.5 | 37 | $Fe_2(SO_4)_3 \cdot 9 H_2O$ | 0.5 | 7/32 |
| 99.0 | 37 | $Fe_2(SO_4)_3 \cdot 9 H_2O$ | 1.0 | ⅛ |
| 98.5 | 37 | $Fe_2(SO_4)_3 \cdot 9 H_2O$ | 1.5 | ⅛ |
| 98.0 | 37 | $Fe_2(SO_4)_3 \cdot 9 H_2O$ | 2.0 | 1/16 |

EXAMPLE 5

DSM I—$M^I M^{III}$ Salts

DSM I was compounded with hydrated mixed salts of the $M^I M^{III}$ type, mixed with water and tested for sag resistance in accordance with Test Procedure I in the proportions set forth below to give the sag results reported in the final column.

| DSM I (gm) | WATER (gm) | ADDITIVE | AMOUNT ADDITIVE (gm) | SAG (inches) |
|---|---|---|---|---|
| 99.5 | 25 | $K_2SO_4 \cdot Al_2(SO_4)_3$ | 0.5 | F/O |

-continued

| DSM I (gm) | WATER (gm) | ADDITIVE | AMOUNT ADDITIVE (gm) | SAG (inches) |
|---|---|---|---|---|
| 99.0 | 25 | $K_2SO_4 \cdot Al_2(SO_4)_3 \cdot 24 H_2O$ | 1.0 | 15/16 |
| 98.5 | 25 | $K_2SO_4 \cdot Al_2(SO_4)_3 \cdot 24 H_2O$ | 1.5 | 3/16 |
| 98.0 | 25 | $K_2SO_4 \cdot Al_2(SO_4)_3 \cdot 24 H_2O$ | 2.0 | 1/32 |
| 99.5 | 25 | $Na_2(SO_4) \cdot Al_2(SO_4)_3 \cdot 24 H_2O$ | 0.5 | F/O |
| 99.0 | 25 | $Na_2(SO_4) \cdot Al_2(SO_4)_3 \cdot 24 H_2O$ | 1.0 | ⅛ |
| 98.5 | 25 | $Na_2(SO_4) \cdot Al_2(SO_4)_3 \cdot 24 H_2O$ | 1.5 | 1/32 |
| 98.0 | 25 | $Na_2(SO_4) \cdot Al_2(SO_4)_3 \cdot 24 H_2O$ | 2.0 | 0 |
| 99.5 | 25 | $(NH_4)_2(SO_4) \cdot Al_2(SO_4)_3 \cdot 24 H_2O$ | 0.5 | F/O |
| 99.0 | 25 | $(NH_4)_2(SO_4) \cdot Al_2(SO_4)_3 \cdot 24 H_2O$ | 1.0 | 11/16 |
| 98.5 | 25 | $(NH_4)_2(SO_4) \cdot Al_2(SO_4)_3 \cdot 24 H_2O$ | 1.5 | ⅛ |
| 98.0 | 25 | $(NH_4)_2(SO_4) \cdot Al_2(SO_4)_3 \cdot 24 H_2O$ | 2.0 | 1/16 |
| 98.5 | 25 | $NH_4Fe(SO_4)_2 \cdot 12 H_2O$ | 1.5 | ⅛ |
| 98.5 | 25 | $K_2SO_4 Cr_2(SO_4)_3 \cdot 24 H_2O$ | 1.5 | 3/16 |

In accordance with the above procedure, but using DSM II in place of DSM I, the following results are obtained.

| DSM II (gm) | WATER (gm) | ADDITIVE | AMOUNT ADDITIVE (gm) | SAG (inches) |
|---|---|---|---|---|
| 99.5 | 37 | $K_2SO_4 \cdot Al_2(SO_4)_3 \cdot 24 H_2O$ | 0.5 | 5/16 |
| 99.0 | 37 | $K_2SO_4 \cdot Al_2(SO_4)_3 \cdot 24 H_2O$ | 1.0 | 3/16 |
| 98.5 | 37 | $K_2SO_4 \cdot Al_2(SO_4)_3 \cdot 24 H_2O$ | 1.5 | 1/16 |
| 98.0 | 37 | $K_2SO_4 \cdot Al_2(SO_4)_3 \cdot 24 H_2O$ | 2.0 | 1/32 |
| 99.5 | 37 | $Na_2 SO_4 \cdot Al_2(SO_4)_3 \cdot 24 H_2O$ | 0.5 | ⅜ |
| 99.0 | 37 | $Na_2 SO_4 \cdot Al_2(SO_4)_3 \cdot 24 H_2O$ | 1.0 | ⅛ |
| 98.5 | 37 | $Na_2 SO_4 \cdot Al_2(SO_4)_3 \cdot 24 H_2O$ | 1.5 | 1/32 |
| 98.0 | 37 | $Na_2 SO_4 \cdot Al_2(SO_4)_3 \cdot 24 H_2O$ | 2.0 | 0 |
| 99.5 | 37 | $(NH_4)_2SO_4 \cdot Al_2(SO_4)_3 \cdot 24 H_2O$ | 0.5 | 5/32 |
| 99.0 | 37 | $(NH_4)_2SO_4 \cdot Al_2(SO_4)_3 \cdot 24 H_2O$ | 1.0 | 3/16 |
| 98.5 | 37 | $(NH_4)_2SO_4 \cdot Al_2(SO_4)_3 \cdot 24 H_2O$ | 1.5 | 3/32 |
| 98.0 | 37 | $(NH_4)_2SO_4 \cdot Al_2(SO_4)_3 \cdot 24 H_2O$ | 2.0 | 1/16 |
| 98.5 | 37 | $NH_4Fe(SO_4)_2 \cdot 12 H_2O$ | 1.5 | ⅛ |

EXAMPLE 6

Experiments were carried out using DSM Ia, a dry set mortar mix of the composition of Formulation I wherein the Methocel ® is replaced with another polymer and the added salt was $Al_2(SO_4)_3 \cdot 14H_2O$. The results using Test Procedure I are as follows:

| DSM I a | WATER | AMOUNT SALT | POLYMER | SAG |
|---|---|---|---|---|
| 98.5 | 25 | 1.5 | Natrosol | 0 |
| 98.5 | 25 | 1.5 | Klucel | 0 |
| 98.5 | 25 | 1 | Reten | 0 |

Natrosol ® is a hydroxyethyl methyl cellulose and Klucel ® is a hydroxypropyl methyl cellulose, both manufactured by Hercules, Inc. Reten ® is a polyacrylamide also manufactured by Hercules, Inc.

EXAMPLE 7

The following dry-set mortar mix was prepared and tested for necessary properties including sag resistance in accordance with Test Procedure I.

```
  381 gms. of Portland cement
    5 gms. of methyl hydroxypropyl cellulose*
    2 gms. of polyvinyl alcohol 87% hydroxyzed
   12 gms. of powdered aluminum sulfate with 18 waters of
          hydration
  600 gms. of −30 mesh sand
 1000 gms.
```
Dow Chem. Co., Methocel ®, 4000 cps, 90 HG grade.

To the 1000 gms of mix was added 250 gms of water. The mortar showed good bond to absorptive and non-absorptive tile, adequate open time and adjustability, good initial set time and excellent sag resistance.

EXAMPLE 8

Portland Cement, Sand together with Clay and Alum

A dry set mortar mix consisting of equal parts of Portland cement and fine sand as well as Methocel ® (4000 cps, 90 HG, 0.6%) was prepared. Hydrated aluminum sulfate and finely divided clay (attapulgite or kaolin) were added and the resultant dry mixture combined with water. The resultant mortar was submitted to Test Procedure I with the following results:

| Cement/Sand Amt. gms. | Methocel | Clay Additive | Amount Clay | Amount Salt (gms.) | Amount of Sag (inches) |
|---|---|---|---|---|---|
| 98.8 | 0.6 | Attagel 150 | 0.6 | 0.0 | F/O |
| 98.5 | 0.6 | Attagel 150 | 0.6 | 0.3 | ⅛ |
| 98.3 | 0.6 | Attagel 150 | 1.1 | 0.0 | ⅛ |

-continued

| Cement/Sand Amt. gms. | Methocel | Clay Additive | Amount Clay | Amount Salt (gms.) | Amount of Sag (inches) |
|---|---|---|---|---|---|
| 98.4 | 0.6 | Georgia Kaolin | 1.0 | 0.0 | 5/16 |
| 98.1 | 0.6 | Georgia Kaolin | 1.0 | 0.3 | 3/32 |

EXAMPLE 9

MDM I—Aluminum Salts

MDM I was compounded with hydrated aluminum salts and gelatinous aluminum hydroxide (prepared in situ) mixed with water and tested for sag resistance in accordance with Test Procedure II in the proportions set forth below to give the sag results reported in the final column.

| MDM I (gm) | WATER (gm) | ADDITIVE | AMOUNT ADDITIVE (gm) | SAG (inches) |
|---|---|---|---|---|
| 98.6 | 25 | $Al_2(SO_4)_3 \cdot 14H_2O$ | 1.2 | No sag |
| 98.28 | 25 | $Al_2(SO_4)_3 \cdot 14H_2O$ + $Ca(CH_2)$ | 1.25 0.47 | No sag |

In accordance with the above procedure but where, in place of $Al_2(SO_4)_3.14H_2O$, there is utilized $MnSO_4H_2O$, $Cr_2(SO_4)_3$, $18H_2O$, $CuSO_4.5H_2O$, $NiSO_4.6H_2O$, $ZnSO_4.7H_2O$ $Sb_2(SO_4)_3$, $Fe_2(SO_4)_3.9H_2O$, $K_2SO_4.Al_2(SO_4)_3.24H_2O$, $Na_2(SO_4)Al_2(SO_4)_3.24H_2O$, $(NH_4)_2SO_4 Al_2(SO_4).24H_2O$, $NH_2Fe(SO_4)_2.12H_2O$ and $K_2SO_4Cr_2(SO_4)_3.24H_2O$, there are obtained similar results.

EXAMPLE 10

DSM I—Gelatinous Aluminum Hydroxide

DSM I was compounded with gelatinous aluminum hydroxide, mixed with water and tested for sag resistance in accordance with Test Procedure I in the proportions set forth below to give the sag results reported in the final column.

| DSM I (gm) | WATER (gm) | ADDITIVE | AMOUNT ADDITIVE | SAG (Inches) |
|---|---|---|---|---|
| 98.2 | 25 | Gelatinous $Al(OH)_3$ | 1.2 | 0 |

In accordance with the above procedure, but where in place of gelatinous aluminum hydroxide there is employed a gelatinous hydroxide of iron, cobalt, nickel or chromium, similar results are obtained.

EXAMPLE 11

Experiments were carried out using DSM Ib, a dry set mortar mix of the composition of Formulation I wherein half the amount of Methocel ® is used and is supplemented with a hydroxyalkyl cellulose polymer and the added salt was $Al_2(SO_4)_3.14H_2O$.

| DSM I b | WATER | AMOUNT SALT | POLYMER | SAG |
|---|---|---|---|---|
| 98.8 | 25 | 1.2 | Hydroxy propyl cellulose | 0 |
| 98.8 | 25 | 1.2 | hydroxy ethyl cellulose | 0 |

EXAMPLE 12

Latex-containing sag resistant cementitious compositions are obtained using DSM I. Where the latex is a styrenebutadiene latex either a salt or a gelatinous hydroxide is added. With vinyl chloride-based latexes gelatinous hydroxide is substantially preferred.

(A) Styrene-butadiene copolymer latex (aqueous dispersion):

| DSM I | WATER | LATEX | $Al_2(SO_4)_3$ | ALUM. HYDROXIDE | SAG |
|---|---|---|---|---|---|
| 100 | 25 | — | — | — | F/0 |
| 98.8 | 28 | 1.2 | — | 0 |
| 98.8 | 27 | — | 1.2 | 0 |

(B) Polyvinyl chloride latex (aqueous dispersion):

| DSM I | WATER | LATEX | ALUM. HYDROXIDE | SAG |
|---|---|---|---|---|
| 100 | 25 | 26 | — | F/0 |
| 100 | 25 | 26 | 1.2 | 0 |

EXAMPLE 13

Sag resistance is imparted to non-cementitious adhesives by the addition of a gelatinous metal hydroxide or lime and a salt convertible to a gelatinous or metal hydroxide.

Polyvinyl acetate resin based adhesive:

| ADHESIVE | $Al_2(SO_4)_3 \cdot 14H_2O$ | GELATINOUS $Al(OH)_3$ | SAG (Inches) |
|---|---|---|---|
| 100 | — | — | F/O |
| 98.75 | 1.25 | — | 1/16 |
| 98.28 | 1.25 | 0.47 | 1/16 |

We claim:

1. A composition capable of admixture with water to form a sag resistant hydraulic cementitious composition, the composition before said admixture comprising:
    (a) at least 20% by weight, based on the weight of the composition, of an hydraulic cement with from about 0.5 to about 50% by weight of at least one substantially water insoluble polymer;
    (b) at least 0.2% by weight, based on the weight of the composition, of at least one water soluble high molecular weight polymer; and
    (c) from about 0.2 to about 5.0% by weight based on the weight of the composition, of at least one sag resistance imparting agent selected from among gelatinous metal hydroxides and metal salts capable of forming a gelatinous or hydrated hydroxide in the presence of aqueous base.

2. A composition according to claim 1 wherein the water insoluble polymer is in the form of a latex.

3. A composition according to claim 1 wherein the water insoluble polymer is selected from among copolymers of styrene and butadiene, epoxy resins, polyvinyl chloride, polyvinylidene chloride, neoprene elastomers and polyvinyl acetate.

4. A composition according to claim 1 wherein the metal salt of (c) is a water soluble salt.

5. The composition according to claim 4 wherein the metal salt is a water soluble hydrated salt.

6. A composition according to claim 1 wherein the gelatinous metal hydroxide is aluminum hydroxide.

7. A composition according to claim 1 which also comprises an inert filler.

8. A composition according to claim 7 wherein said filler is selected from the group consisting of sand, limestone, pigment, powdered inert metal, perlite, vermiculite, talc and glass beads.

9. A composition according to claim 1 wherein the water soluble polymer of (b) is selected from the group consisting of water soluble cellulose ethers, polyvinyl alcohols, polyacrylamides, or combinations thereof.

10. A composition according to claim 9 wherein the cellulose ether is the methyl ether of cellulose, hydroxypropylmethyl cellulose, hydroxypropyl cellulose, or hydroxyethyl cellulose.

11. A composition according to claim 1 wherein the metal salt of (c) comprises at least one anion and at least one cation, said cationic moieties being selected from the groups consisting of:
(a) aluminum cations,
(b) cations of the transition elements of period 4 other than copper,
(c) the cations of cerium or antimony,
(d) the mixed cations of the classification $M^I M^{III}$ wherein $M^I$ is an alkali metal or ammonium cation and $M^{III}$ is a trivalent metallic cation of periods 3 or 4 of the periodic table, and
the anions are selected from anions of strong mineral acids and of alkanoic acids having up to 20 carbon atoms in the chain.

12. A composition according to claim 1 wherein the salt is a hydrated aluminum salt.

13. A composition according to claim 11 wherein the salt is a hydrated salt of chromium, manganese, iron, cobalt, nickel, or zinc and the anion is selected from the group consisting of sulphate, chloride, nitrate, acetate, oxalate, and stearate.

14. A composition according to claim 11 wherein the cationic portion of the salt consists of at least one member of the group consisting of sodium, potassium and ammonium together with at least one member of the group consisting of aluminum, chromium and iron, with an anion selected from the group consisting of sulphate, chloride, nitrate, oxalate and stearate.

15. A composition according to claim 14 wherein the cationic portion of the salt contains ions of one $M^I$ moiety and one $M^{III}$ moiety.

16. A composition according to claim 11 which comprises between about 20 to about 99% by weight of Portland cement, between about 0.2 and about 6% by weight of the high molecular weight water soluble polymer and between 0.2 and about 5% by weight of the sag resistance imparting agent to a total not exceeding 100% by weight.

17. A composition according to claim 16 which comprises as the high molecular weight water soluble polymer, between 0.2 and about 6% by weight of a cellulose ether and between about 0.1 and about 6% by weight of polyvinyl alcohol of 70% to 90% hydrolyzed grade, to a total weight of polymer not exceeding about 6% by weight.

18. A sag resistant hydraulic cementitious composition comprising a composition of claim 1 and water.

19. A composition of claim 18 comprising between about 15 and about 50% by weight of water.

20. A composition according to claim 1 in which the base is lime.

21. A composition according to claim 20 in which the lime is incorporated in the Portland cement.

22. A method of causing a first covering surfacing having a first surface to adhere to a substrate having a second surface which comprises
(A) applying a sag resistant aqueous composition comprising before admixture with water
(a) at least 20% by weight, based on the weight of the composition, of an hydraulic cement with from about 0.5 to about 50% by weight of at least one substantially water insoluble polymer;
(b) at least 0.2% by weight, based on the weight of the composition, of at least one water soluble high molecular weight polymer; and
(c) from about 0.2 to about 5.0% by weight based on the weight of the composition, of at least one sag resistance imparting agent selected from the group consisting of gelatinous metal hydroxides and metal salts capable of forming a gelatinous or hydrated hydroxide in the presence of aqueous base to said second surface, and
(B) pressing said first surface coated with said composition onto said second surface.

23. A method of claim 22 wherein said surfaces are porous to water.

24. A method according to claim 23 wherein said first substrate is a ceramic tile and said first surface is an unglazed surface.

25. The entire assembly comprising a plurality of tiles arranged in an edge-to-edge spaced apart relationship upon an even surface wherein there is located between said tiles and surface a cured layer of a sag resistant aqueous composition comprising before admixture with water
(a) at least 20% by weight, based on the weight of the composition, of an hydraulic cement with from about 0.5 to about 50% by weight of at least one substantially water insoluble polymer;
(b) at least 0.2% by weight, based on the weight of the composition, of at least one water soluble high molecular weight polymer; and
(c) from about 0.2 to about 5.0% by weight, based on the weight of the composition, of at least one sag resistance imparting agent selected from the group consisting of gelatinous metal hydroxides and metal salts capable of forming a gelatinous or hydrated hydroxide in the presence of aqueous base.

* * * * *